United States Patent [19]
Hergt

[11] Patent Number: 5,551,837
[45] Date of Patent: Sep. 3, 1996

[54] APPARATUS FOR REGULATING THE TRANSPORT FLOW OF A LIQUID THAT IS CIRCULATED BY A CENTRIFUGAL PUMP IN A CLOSED PIPE SYSTEM

[75] Inventor: Peter Hergt, Ludwigshafen, Germany

[73] Assignee: KSB Aktiengesellschaft, Frankenthal, Germany

[21] Appl. No.: 256,656
[22] PCT Filed: Dec. 21, 1992
[86] PCT No.: PCT/EP92/02970
§ 371 Date: Jul. 18, 1994
§ 102(e) Date: Jul. 18, 1994
[87] PCT Pub. No.: WO93/14450
PCT Pub. Date: Jul. 22, 1993

[30] Foreign Application Priority Data

Jan. 17, 1992 [DE] Germany ............... 42 01 100.0

[51] Int. Cl.⁶ ............... G05D 7/01; F04D 15/00
[52] U.S. Cl. ............... 415/206; 416/186 R; 415/1
[58] Field of Search ............... 415/1, 206; 416/182, 416/186 R, 223 R

[56] References Cited

U.S. PATENT DOCUMENTS

| | | | |
|---|---|---|---|
| 2,366,251 | 1/1945 | Füllemann | 416/182 |
| 3,205,828 | 9/1965 | Rupp | 415/206 |
| 4,158,527 | 6/1979 | Burkett | 415/1 |
| 4,166,310 | 9/1979 | Rothe | |
| 5,026,256 | 6/1991 | Kuwabara | 417/45 |

FOREIGN PATENT DOCUMENTS

| | | |
|---|---|---|
| 2113875 | 10/1971 | Germany. |
| 3101516 | 8/1982 | Germany. |
| 613892 | 12/1948 | United Kingdom. |

OTHER PUBLICATIONS

Karassik et al., Pump Handbook, 1976, pp. 2–124 to 2–135.

Primary Examiner—Edward K. Look
Assistant Examiner—Michael S. Lee
Attorney, Agent, or Firm—Darby & Darby, P.C.

[57] ABSTRACT

In a closed pipe system, the apparatus regulates the transport flow of a liquid that is circulated by a centrifugal pump. The pump has a characteristic curve that falls in the direction toward zero transport flow from a design point. That is, as the volumetric flow decreases, the pump head increases.

9 Claims, 2 Drawing Sheets

５,５５１,８３７

APPARATUS FOR REGULATING THE TRANSPORT FLOW OF A LIQUID THAT IS CIRCULATED BY A CENTRIFUGAL PUMP IN A CLOSED PIPE SYSTEM

FIELD OF THE INVENTION

The invention relates to an apparatus which regulates the flow through a centrifugal pump used in a closed pipe system.

BACKGROUND OF THE INVENTION

In closed pipe systems, for example heating systems, the demand of the loads connected to the pipe system determines the variable throughflow resistance of the entire system. The loads in a heating system are its heating bodies, where the valves of these heating bodies adapt to the particular heat demand and cause a greater or lesser throughflow resistance.

Since the circulation systems addressed here must be designed for maximum transport flow, but often operate only under partial load, the relationship between the required transport pressure and the transport flow of the centrifugal pump has a characteristic which falls in the direction of zero transport flow. However, the centrifugal pumps which up to now have been used in such circulatory systems have a characteristic which rises in the direction of zero transport flow. That is, the pump head increases as the volumetric flow rate decreases.

If one wished to operate such a centrifugal pump in the system with a steady rpm, the difference between the pressure created by the pump and the specific required pressure had to be throttled out, resulting in a substantial energy loss.

Various regulation systems have already been developed for heating systems to obtain a convenient and economical adaptation to demand. The so-called bypass control is known as a mechanical solution. In a bypass control, a portion of the transport flow is withdrawn by a feedback line of the pressure side of the pump and is again returned to the suction side. This measure does indeed reduce the useful transport flow of the system, but the system characteristic does not shift towards larger transport flows.

At the present time, regulation systems have established themselves which control the rpm of the centrifugal pump so as thereby to achieve broad adaption to various control variables, such as the difference pressure, and the external, inflow, or backflow temperature. This regulation is accomplished either by switching to various prescribed rpms, or, with the correspondingly higher complication continuously varying the rpms. What is true about this rpm regulation in general is that it has small losses compared to the devices described above for regulating the transport flow. However, such a regulatory system is not entirely without losses. Incidentally, with such a regulation too, parts of the pressure difference also must be throttled out.

SUMMARY OF THE INVENTION

It is an object of the present invention to create an apparatus which requires little technical complication, which avoids significant losses, and which adapts to changes of the operating state which occur in a system.

According to the present invention, the object of the present invention is achieved by use of a centrifugal pump whose pump characteristic falls in the direction of zero transport flow.

For the inventive apparatus, a pump characteristic is thus proposed whose pumping head at zero transport flow amounts to about 80% of the pumping head at the design point of the centrifugal pump. Especially with heating systems, use of this type of pump provides especially good adaptation to the operating conditions existing there in heating systems.

A pump characteristic which falls in the direction of zero transport flow can advantageously be realized with a centrifugal pump whose impeller blades have a blade exit angle of 60° or more, preferably 90°. It should be noted that such an impeller, up to now, has not been usual.

Another supporting factor to achieve a falling pump characteristic is a large number of blades, for example 11 or more. The blade exit angle and the number of blades are mutually related, so that the blade exit angle can be reduced as the number of blades is increased.

Still another supporting factor for achieving a falling pump characteristic is for the impeller to have entry edges which are only slightly inclined relative to the rotation axis of the centrifugal pump. Finally, it is also proposed that the approach edge in the transition region between a collection chamber following the impeller and the entry into the pressure connection piece be designed with a sharp edge and with a right angle. This measure, too, helps to reduce the pump characteristic in the region of the zero transport point.

It is advantageous for the electric motor that drives the centrifugal pump to have a stiff characteristic, so that a change of torque will cause only a slight change of the rotational speed. This feature limits to a tolerable minimum the undesirable rise of the pump characteristic towards smaller transport amounts, which is caused by the electric motor.

DETAILED DESCRIPTION OF THE PRESENT INVENTION

Figure 1:
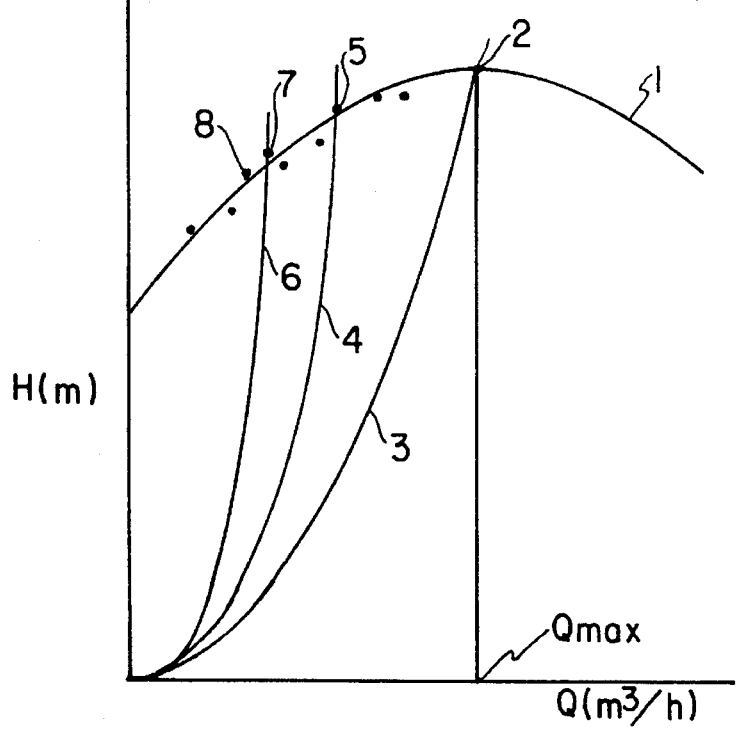
FIG. 1 shows a transport flow/pumping head diagram of a heating system according to the present invention.

Referring now to FIG. 1, the abscissa of this diagram is scaled for the transport flow Q in $m^3/h$, the ordinate specifies the pumping head H in m. A characteristic (1) of a pump is shown here refers to a circulation pump for a heating system. The pump characteristic for this pump is bell-shaped. The pump's design point (2) is the intersection point of the pump characteristic curve (1) with a system characteristic curve (3). The design point is situated about at its maximum, but it can also lie in the section which drops off towards Q=0. For pump operation, and also for the regulation apparatus, only that part of the pump characteristic (1) is used which lies between the design point (2) and the transport flow Q=0.

The heating system can be throttled, e.g., by the activation of a valve on a heating body. This results in a steeper system characteristic (4), which will have a new intersection point (5) with the falling pump characteristic (1). This new operating point (5) has lower pumping heads and transport quantities. Further throttling results in a steeper system characteristic (6), so that the pump operating point (7) has still lower output.

The lines and points discussed up to now represent a theoretical basis. The actual demand points (8), occurring in an actual system, would differ slightly from this.

Automatic adaption is actually achieved, without the need for complicated regulation having mechanical and/or electronic components that may be susceptible to interference. This results solely from operating with the falling pump characteristic curve which corresponds to the operating states that prevail in a closed pipeline system with variable throughflow resistances.

Figure 2:
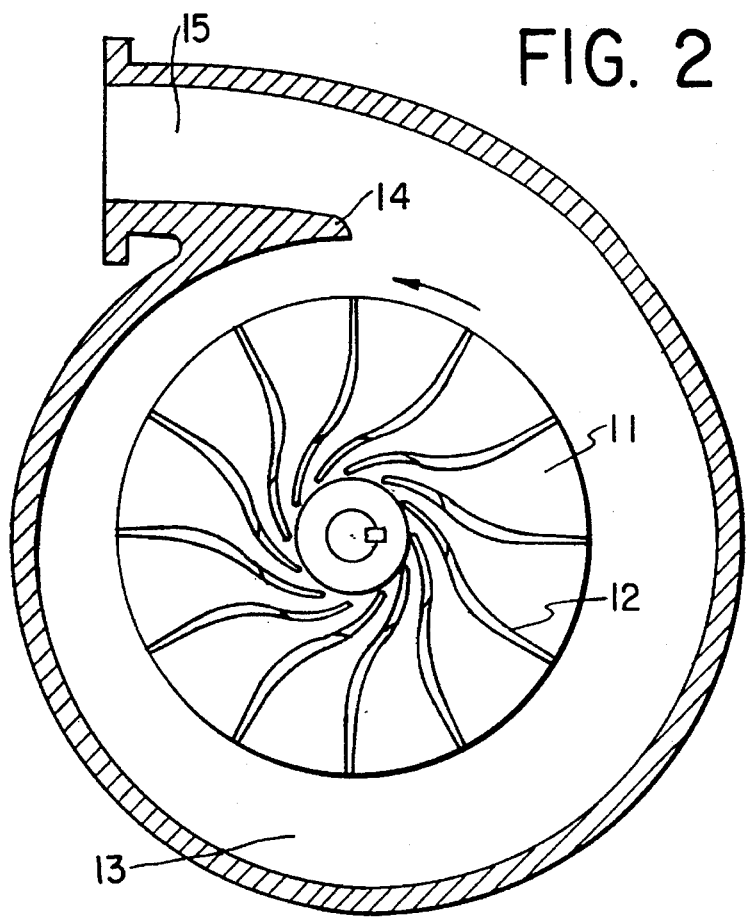
FIG. 2 shows an impeller, with the cover plate removed, according to the present invention.
Figure 3:
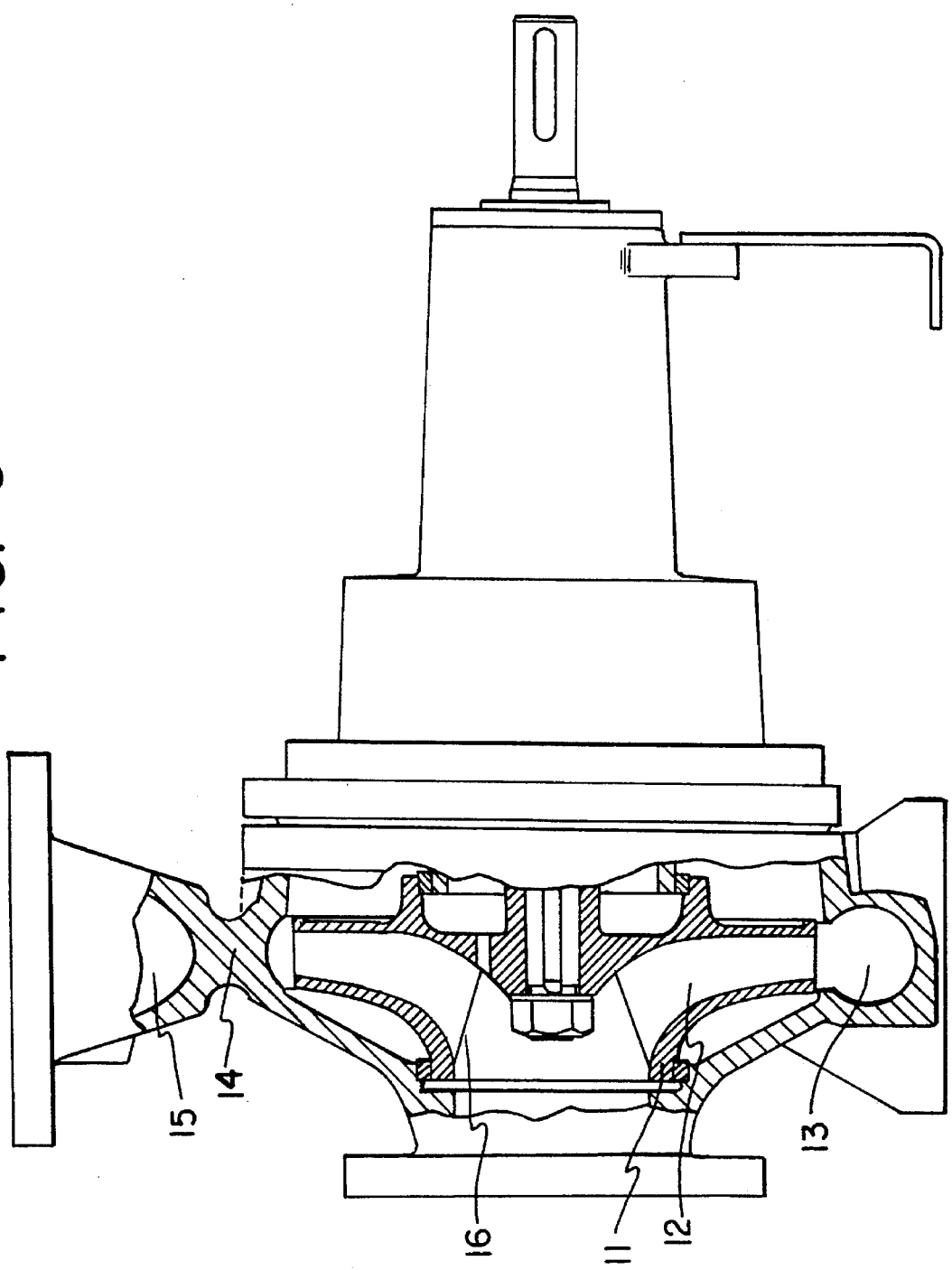
FIG. 3 shows a centrifugal pump inlet and outlet according to the present invention.

FIGS. 2 and 3 illustrate a centrifugal pump having a characteristic curve described above. The pump includes an impeller 11 having blades 12. The blades 12 have an entry edge 16 (see FIG. 2). A collection chamber 13 is disposed downstream of the impeller 11. The pump housing has a tongue 14 disposed in a transition region between the collection chamber 13 and an outlet of the pump into an entry of a pressure connection piece 15. The tongue 14 has a sharp edge having a right angle on a side facing the impeller 11 and has a rounded edge on a side facing the pressure connection piece 15.

I claim:

1. An apparatus for regulating the transport flow of a liquid that is circulated in a closed pipe system by a centrifugal pump to regulate the circulation of water in a heating system comprising a centrifugal pump having a pump characteristic curve that falls in the direction toward zero transport flow from a design point.

2. The apparatus of claim 1, wherein the pump characteristic curve has a pumping head at a transport flow of approximately 80% of the pumping head at the design point of the centrifugal pump.

3. The apparatus of claim 1, wherein the centrifugal pump has impeller blades that have a blade exit angle of at least 60 degrees.

4. The apparatus of claim 3, wherein the blade exit angle is about 90 degrees.

5. The apparatus of claim 1, wherein the centrifugal pump has an impeller having at least 11 blades.

6. The apparatus of claim 1, wherein the centrifugal pump has an impeller having entry edges which are only slightly inclined relative to the rotation axis of the centrifugal pump.

7. The apparatus of claim 1, wherein the centrifugal pump has a housing having a tongue disposed in a transition region between a collection chamber downstream of an impeller and an outlet of the pump into an entry of a pressure connection piece, said tongue has a sharp edge having a right angle on a side facing the impeller and has a rounded edge on a side facing the pressure connection piece.

8. The apparatus of claim 1 further comprising an electric motor that drives the centrifugal pump, said electric motor having a characteristic such that a change of torque causes only a minimal change of rotational speed.

9. The apparatus of claim 1, wherein the pump characteristic curve falls to zero transport flow from the design point.

* * * * *